United States Patent
Yang et al.

(10) Patent No.: US 9,774,844 B2
(45) Date of Patent: Sep. 26, 2017

(54) UNPACKING METHOD, UNPACKING DEVICE AND UNPACKING SYSTEM OF PACKED FRAME

(71) Applicant: NATIONAL CHENG KUNG UNIVERSITY, Tainan (TW)

(72) Inventors: Jar-Ferr Yang, Tainan (TW); Hung-Ming Wang, Tainan (TW); Hsi-Chun Tseng, Zhongli (TW); Ke-Ying Liao, Taipei (TW)

(73) Assignee: National Cheng Kung University, Tainan (TW)

( * ) Notice: Subject to any disclaimer, the term of this patent is extended or adjusted under 35 U.S.C. 154(b) by 467 days.

(21) Appl. No.: 14/505,153

(22) Filed: Oct. 2, 2014

(65) Prior Publication Data

US 2015/0092028 A1    Apr. 2, 2015

(30) Foreign Application Priority Data

Oct. 2, 2013 (TW) .............................. 102135719 A

(51) Int. Cl.
*H04N 13/04* (2006.01)
*H04N 13/00* (2006.01)
*H04N 19/597* (2014.01)
*H04N 19/59* (2014.01)

(52) U.S. Cl.
CPC ..... *H04N 13/0429* (2013.01); *H04N 13/0029* (2013.01); *H04N 13/0048* (2013.01); *H04N 13/0059* (2013.01); *H04N 13/0422* (2013.01); *H04N 19/59* (2014.11); *H04N 19/597* (2014.11); *H04N 2213/003* (2013.01)

(58) Field of Classification Search
CPC combination set(s) only.
See application file for complete search history.

(56) References Cited

U.S. PATENT DOCUMENTS

| 2010/0045780 | A1 | 2/2010 | Kwon et al. |
| 2010/0310155 | A1 | 12/2010 | Newton et al. |
| 2011/0286530 | A1* | 11/2011 | Tian ................... H04N 21/2365 375/240.25 |

FOREIGN PATENT DOCUMENTS

| CN | 101904176 A | 12/2010 |
| CN | 103210653 A | 7/2013 |
| JP | 2008-141516 A | 6/2008 |
| JP | 2011-508498 A | 3/2011 |
| JP | 2013-519286 A | 5/2013 |

(Continued)

OTHER PUBLICATIONS

Heresy, VIML-Signals of 3D Displays, last modified Mar. 29, 2010, 5 pages, http://viml.nchc.org.tw/blog/paper_info.php?CLASS_ID=1&SUB_ID=1&PAPER_ID=164.

*Primary Examiner* — Alex Liew
(74) *Attorney, Agent, or Firm* — Muncy, Geissler, Olds & Lowe, P.C.

(57) ABSTRACT

An unpacking method, an unpacking device and an unpacking system of a packed frame are disclosed. The packed frame is to be displayed on a screen and includes a color frame and a resized depth frame, and the color frame is corresponding to the resized depth frame. The center of the color frame is displayed in the central area of the screen. The unpacking method includes the steps of: extracting the color frame and the resized depth frame from the packed frame; and restoring the resized depth frame to obtain an original depth frame.

42 Claims, 15 Drawing Sheets

(56) References Cited

FOREIGN PATENT DOCUMENTS

| KR | 10-2010-0102161 A | 9/2010 |
|---|---|---|
| TW | 201310973 A1 | 3/2013 |
| WO | WO 2009/081335 A1 | 7/2009 |
| WO | WO 2010/108024 A1 | 9/2010 |
| WO | WO 2012/014171 A1 | 2/2012 |

* cited by examiner

UNPACKING METHOD, UNPACKING DEVICE AND UNPACKING SYSTEM OF PACKED FRAME

CROSS REFERENCE TO RELATED APPLICATIONS

This Non-provisional application claims priority under 35 U.S.C. §119(a) on Patent Application No(s). 102135719 filed in Taiwan, Republic of China on Oct. 2, 2013, the entire contents of which are hereby incorporated by reference.

BACKGROUND OF THE INVENTION

Field of Invention

The present invention relates to an unpacking method, an unpacking device and an unpacking system of a packed frame.

Related Art

As the progress of technologies, the performance and quality of electronic products have become the prior consideration of electronic product development. For example, the basic requirement for display devices is to provide a high-definition and more comfortable images. Except for the basic requirement, the manufacturer further develops the 3D display device for providing multi-view angle 3D images as well as a new visual experience to the users.

In general, a 3D image generating system can analyze the original 2D image data (e.g. an original color frame) so as to produce an original depth frame corresponding to the original color frame, and then transmit the original color frame and the original depth frame to a 3D display device of the user through the conventional transmission apparatus. After receiving the original color frame and the original depth frame, the 3D display device can process the frames by depth-image-based rendering (DIBR) to produce two or more multi-view angle images for any naked-eye 3D display device or to produce a left-eye image and a right-eye image for a glasses-type 3D display device.

In order to reduce the total data transmission amount to enhance the image transmission efficiency, the original color frame and the original depth frame are usually packed into a packed frame, which is then transmitted to user's 3D display device through the current transmission device. After receiving the packed frame, the 3D display device can unpack the received packed frame so as to restore the frames and produce two or more multi-view angle images for any naked-eye 3D display device or a left-eye image and a right-eye image for a glasses-type 3D display device.

SUMMARY OF THE INVENTION

An objective of the present invention is to provide a novel unpacking method, device and system.

Another objective of the present invention is to provide an unpacking method, device and system which can display the packed frame in a 2D screen. The packed frame includes a color frame, and the center of the color frame is displayed at the central area of the screen. The displayed 2D images are smoothly shown in the central area of a screen and will not make the viewer uncomfortable.

To achieve the above objective, the present invention discloses an unpacking method of a packed frame. The packed frame is to be displayed on a screen and includes a color frame and a resized depth frame. The color frame is corresponding to the resized depth frame, and the center of the color frame is displayed in a central area of the screen. The unpacking method includes the steps of: extracting the color frame and the resized depth frame from the packed frame; and restoring the resized depth frame to obtain an original depth frame.

To achieve the above objective, the present invention also discloses an unpacking device of a packed frame. The packed frame is to be displayed on a screen and includes a color frame and a resized depth frame. The color frame is corresponding to the resized depth frame, and the center of the color frame is displayed in a central area of the screen. The unpacking device includes an extract processing unit and a restore processing unit. The extract processing unit extracts the color frame and the resized depth frame from the packed frame. The restore processing unit restores the resized depth frame to obtain an original depth frame.

To achieve the above objective, the present invention further discloses an unpacking system of a packed frame. The packed frame is to be displayed on a screen and includes a color frame and a resized depth frame. The color frame is corresponding to the resized depth frame, and the center of the color frame is displayed in a central area of the screen. The unpacking system includes a memory unit and a processing unit. The memory unit stores the packed frame. The processing unit extracts the color frame and the resized depth frame from the packed frame, and restores the resized depth frame to obtain an original depth frame.

As mentioned above, in the invention, the packed frame includes a color frame and a resized depth frame, and the color frame is corresponding to the resized depth frame. The color frame and the resized depth frame are extracted from the packed frame, and an original depth frame is obtained by restoring the resized depth frame. Accordingly, the unpacking method, unpacking device and unpacking system of the invention are different from the conventional art. In addition, the packed frame can be displayed in a screen, and the center of the color frame is displayed at the central area of the screen. The center point of the color frame and the center point of the screen are preferably overlapped and most preferably totally overlapped. Moreover, the color frames (2D images) are smoothly shown in the central area of a screen and will not make the viewer uncomfortable.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
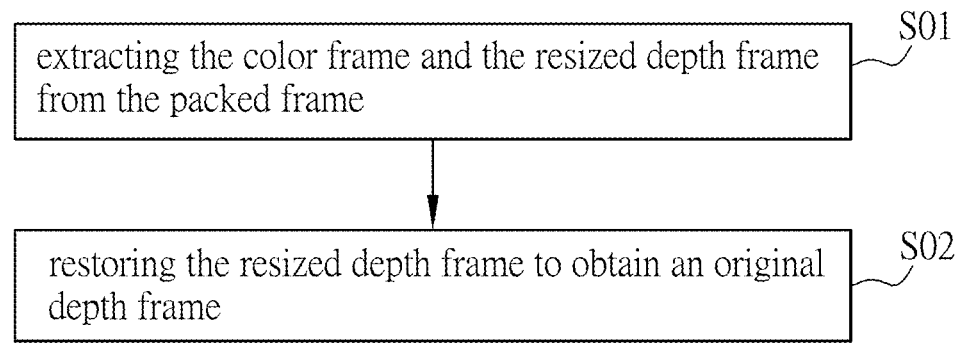
FIG. 1A is a flow chart of an unpacking method of a packed frame according to a preferred embodiment of the invention.
Figure 1B:
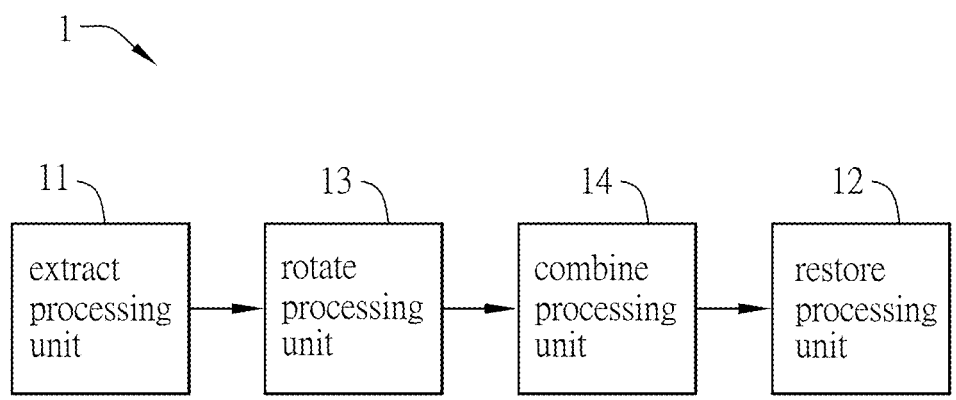
FIG. 1B is a functional block diagram of an unpacking device of a packed frame according to a preferred embodiment of the invention.

FIG. 1A is a flow chart of an unpacking method of a packed frame according to a preferred embodiment of the invention, and FIG. 1B is a functional block diagram of an unpacking device 1 of a packed frame according to a preferred embodiment of the invention.

As shown in FIG. 1A, the unpacking method of a packed frame includes steps S01 and S02. As shown in FIG. 1B, the device 1 includes an extract processing unit 11 and a restore processing unit 12. Moreover, the device 1 further includes a rotate processing unit 13 and a combine processing unit 14. Herein, the extract processing unit 11, the restore processing unit 12, the rotate processing unit 13 and the combine processing unit 14 can be carried out by software executed by a processor. Or, it is also possible to carry out the functions of the extract processing unit 11, the restore processing unit 12, the rotate processing unit 13 and the combine processing unit 14 by hardware or firmware. This invention is not limited.

Figure 2:
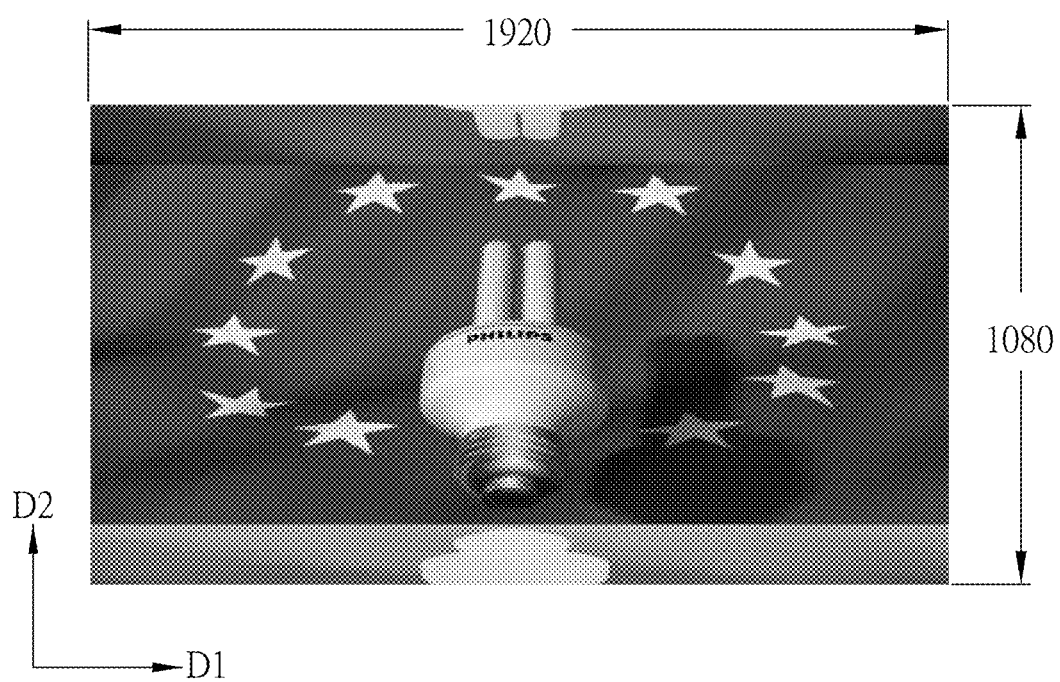
FIGS. 2, 3A-3D and 4A-4B are schematic diagrams showing the procedure for unpacking the packed frame of a first embodiment.
Figure 3A:
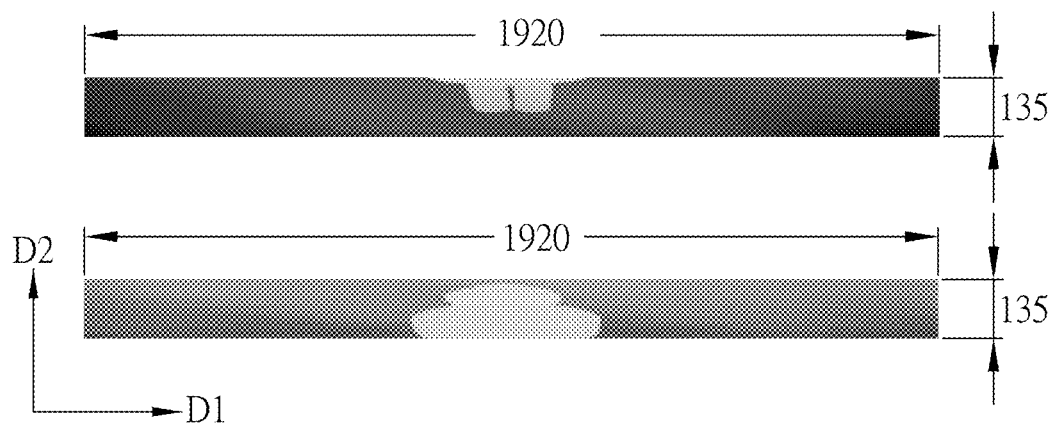
Figure 3B:
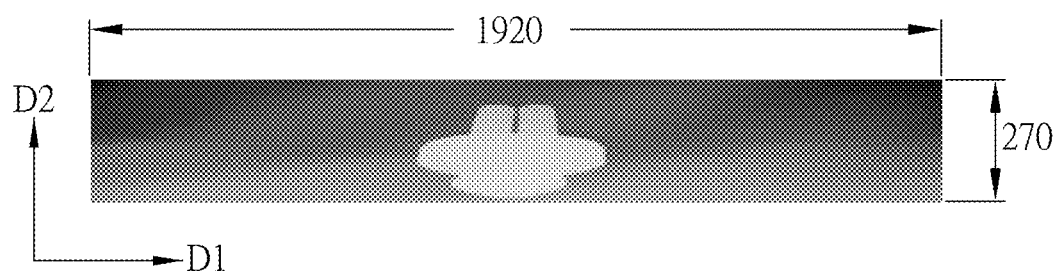
Figure 3C:
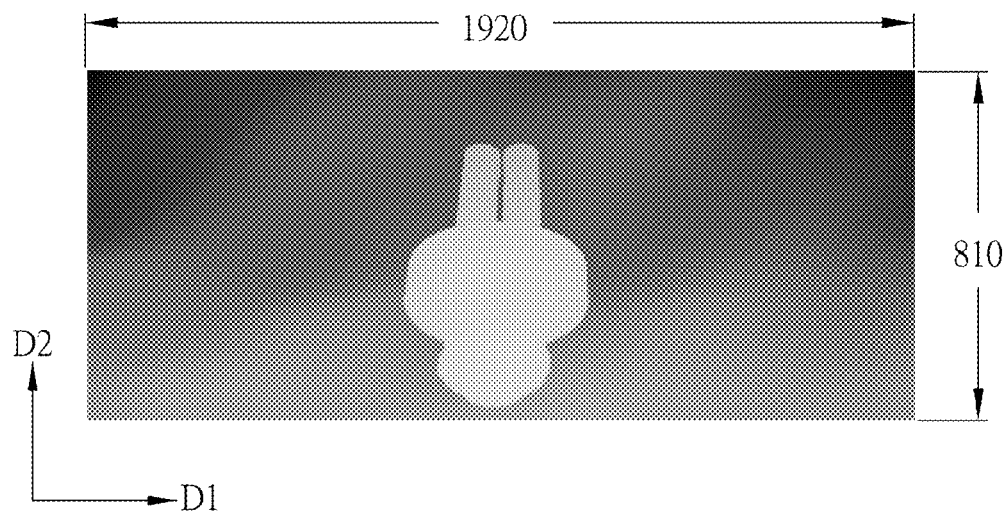
Figure 3D:
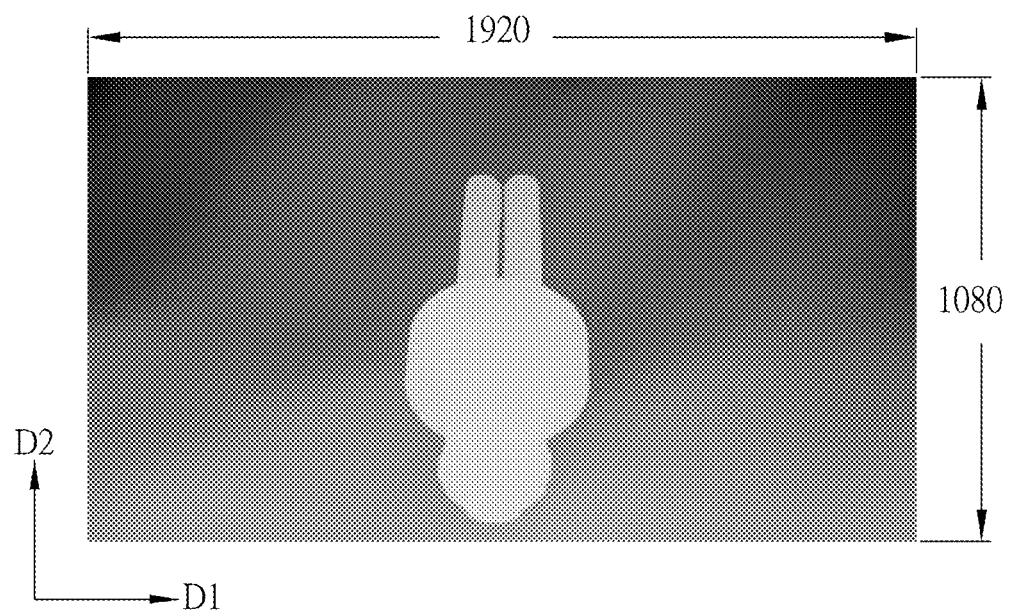
Figure 4A:
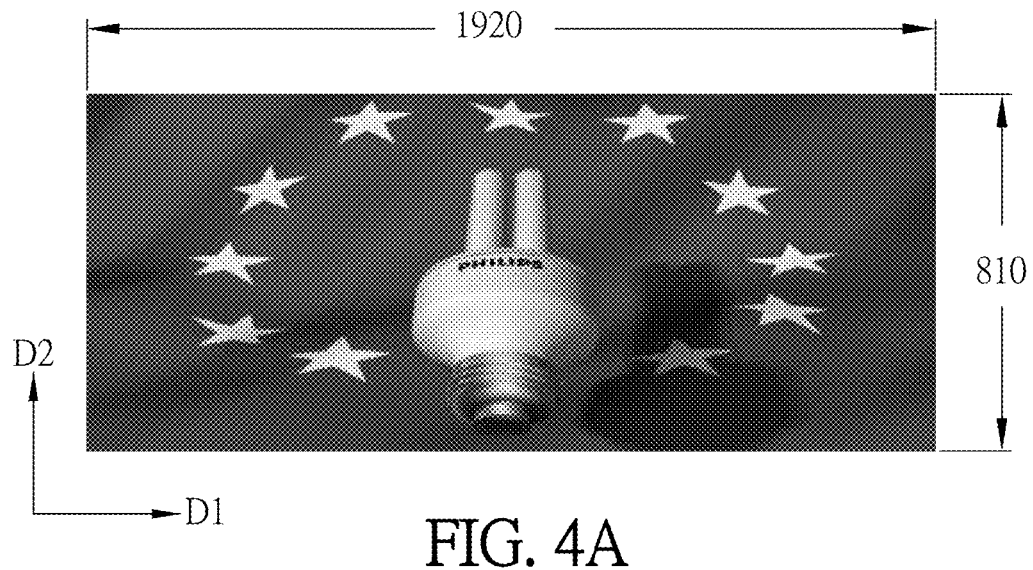
Figure 4B:
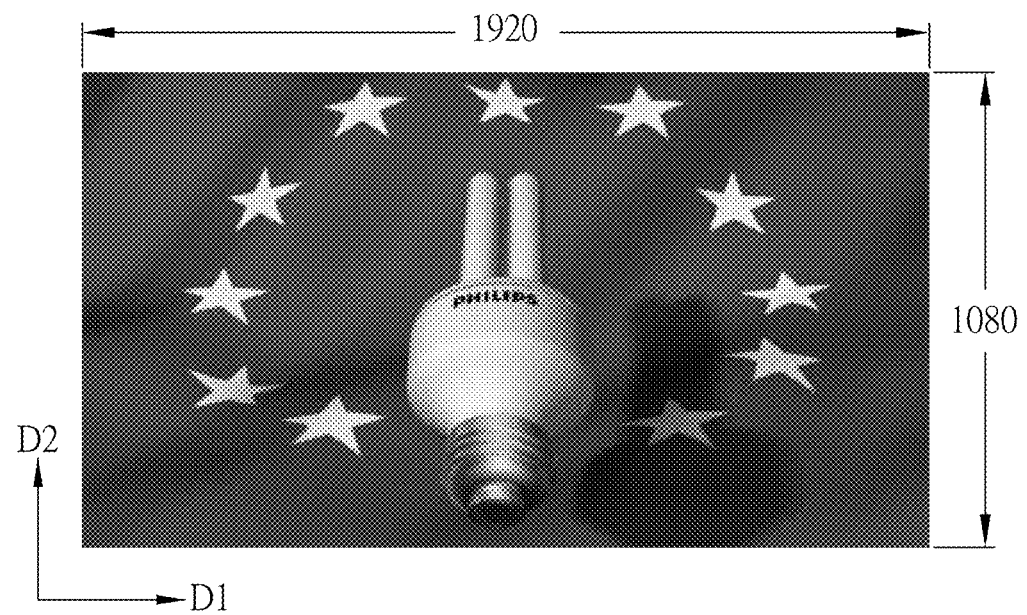

The unpacking method and device 1 of a packed frame will be described hereinafter with reference to FIGS. 2A to 4B. FIGS. 2 to 4B are schematic diagrams showing the procedure for unpacking the packed frame of a first embodiment. FIG. 2 shows a packed frame, FIG. 3A shows two parts of a resized depth frame, FIG. 3B shows a resized depth frame, FIG. 3C shows an intermediate depth frame, FIG. 3D shows an original depth frame, FIG. 4A shows a color frame, and FIG. 4B shows an original color frame. As shown in the figures, a row direction D1 is a horizontal direction of the displayed image, and a column direction D2 is a vertical direction of the displayed image. To be noted, although the shown images in FIGS. 2, 4A and 4B are black-and-white images, they in fact can be color images in a 2D color display device.

In this embodiment, the size of the packed frame of FIG. 2 is, for example but not limited to, 1920×1080 pixels, which is the same as the resolution of the HD 2D display device. Accordingly, the packed frame can be directly displayed on a 2D screen. The packed frame includes a color frame and a resized depth frame. The color frame is a 2D color image and is located at the center part of the packed frame, while the resized depth frame are located at the top and bottom sides of the color frame.

As shown in FIG. 1A, the step S01 of this method is to extract a color frame and a resized depth frame from the packed frame (extracting two parts of the resized depth frame of FIG. 3A and the color frame of FIG. 4A from the packed frame of FIG. 2). Herein, the extract processing unit 11 extracts the two parts of the resized depth frame from the top and bottom sides of the packed frame (horizontal splitting) so as to obtain two parts of the resized depth frame of FIG. 3A and the color frame of FIG. 4A. In this case, the two parts of the resized depth frame are extracted along the row direction D1.

After obtaining the two parts of the resized depth frame, the combine processing unit 14 can combine them to obtain a resized depth frame (from FIG. 3A to FIG. 3B). Before generating the resized depth frame, the rotate processing unit 13 can flip the two parts of the resized depth frame and then the combine processing unit 14 can combine the two parts of the resized depth frame to obtain the resized depth frame. Herein, "flip" is to turn the two parts of the resized depth frame over by 180 degrees and make the parts upside down. The sizes of the two parts of the resized depth frame are the same and are all 1920×135. As a result, the size of the combined resized depth frame is 1920×270, while the size of the color frame is 1920×810 (810=1080−135−135).

Next, the step S02 is performed to restore the resized depth frame to obtain an original depth frame (restoring FIG. 3B to FIG. 3D). Before obtaining the original depth frame of FIG. 3D, the sub-pixels of the resized depth frame of FIG. 3B are rearranged to obtain an intermediate depth frame of FIG. 3C. Then the intermediate depth frame is resized to obtain the original depth frame of FIG. 3D. The sub-pixel rearrangement is to retrieve a first sub-pixel value and a second sub-pixel value of a pixel of the resized depth frame, to store the first sub-pixel value in all sub-pixels of a first pixel of the intermediate depth frame, and to store the second sub-pixel value to all sub-pixels of a second pixel of the intermediate depth frame. In other words, assuming one pixel includes three sub-pixels, the sub-pixel rearrangement is to store a first sub-pixel value of a first pixel of the resized depth frame in all sub-pixels of a first pixel of the intermediate depth frame, to store a second sub-pixel value of the first pixel of the resized depth frame to all sub-pixels of a second pixel of the intermediate depth frame, and to store a third sub-pixel value of the first pixel of the resized depth frame to all sub-pixels of a third pixel of the intermediate depth frame. This rule can be applied to all other pixels and sub-pixels of the frames.

Accordingly, the size of the resized depth frame of FIG. 3B is resized to triple of the size of the original one along the column direction D2, so that the size of the intermediate depth frame of FIG. 3C as well as the data amount thereof is triple of the size of the resized depth frame along the column direction D2. As a result, the resolution of the intermediate depth frame of FIG. 3C is 1920×810 (810=270×3).

Then, the restore processing unit 12 restores the intermediate depth frame to obtain an original depth frame (restoring FIG. 3C to FIG. 3D). In this case, the step of restoring the intermediate depth frame to the original depth frame can be carried out by proportionally upscaling the size of the intermediate depth frame, or increasing the resolution of the intermediate depth frame. In this embodiment, the size of the intermediate depth frame of FIG. 3C is upscaled along the column direction D2 to obtain the original depth frame of FIG. 3D. Herein, the size of the original depth frame is increased to 4/3 of the size of the intermediate depth frame along the column direction D2. As shown in FIG. 3D, the size of the original depth frame is 1920×1080 (1080=810× 4/3). The original depth frame is a gray-level frame (the sub-pixel values in each pixel are the same).

In this embodiment, the unpacking method further includes a step of restoring the color frame to obtain an original color frame (from FIG. 4A to FIG. 4B). The restore processing unit 12 can restore the color frame to proportionally upscale the color frame (1920×x810) to 4/3 of the original one along the column direction D2, thereby obtaining the original color frame. That is, the size of the original color frame of FIG. 4B is 1920×1080 (1080=810×4/3). The original color frame has a preset frame size of 1920×1080, and the size of the packed frame is the same as the preset frame size. In addition, the original depth frame is corresponding to the original color frame. Herein, "corresponding" means the original depth frame and the original color frame have the same size or resolution. Besides, the original depth frame is produced according to the depth values of all pixels in the original color frame. The original depth frame and the original color frame can synthesize according to DIBR so as to produce a 3D image to be displayed by a 3D display device. Since the original depth frame is corresponding to the original color frame, the original depth frame is also corresponding to the color frame.

Figure 5A:
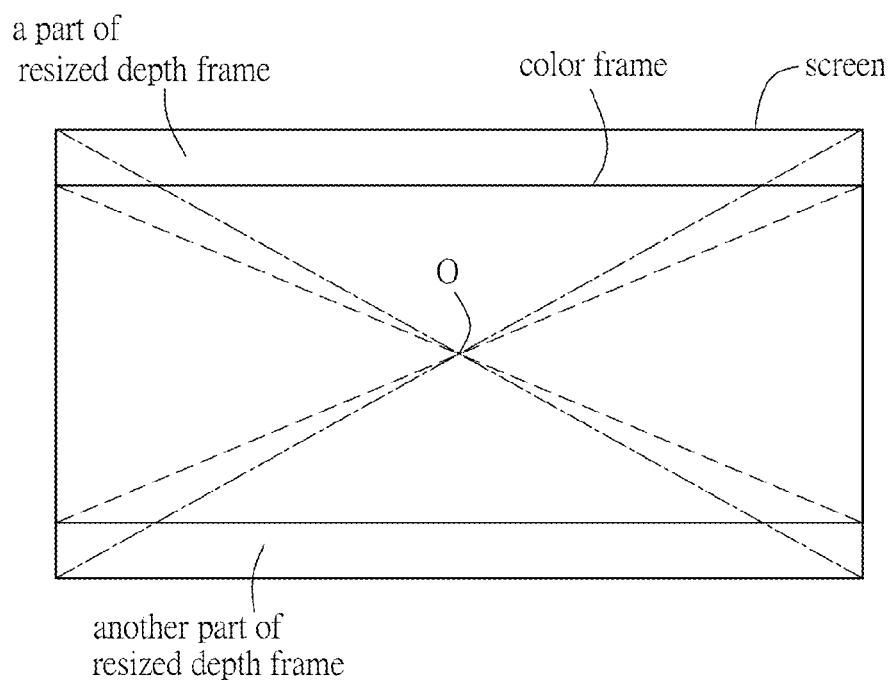
FIG. 5A is a schematic diagram showing the color frame and a screen as a 2D display device displays the packed frame of the first embodiment.

FIG. 5A is a schematic diagram showing the color frame and a screen as a 2D display device displays the packed frame of the first embodiment.

Figure 5B:
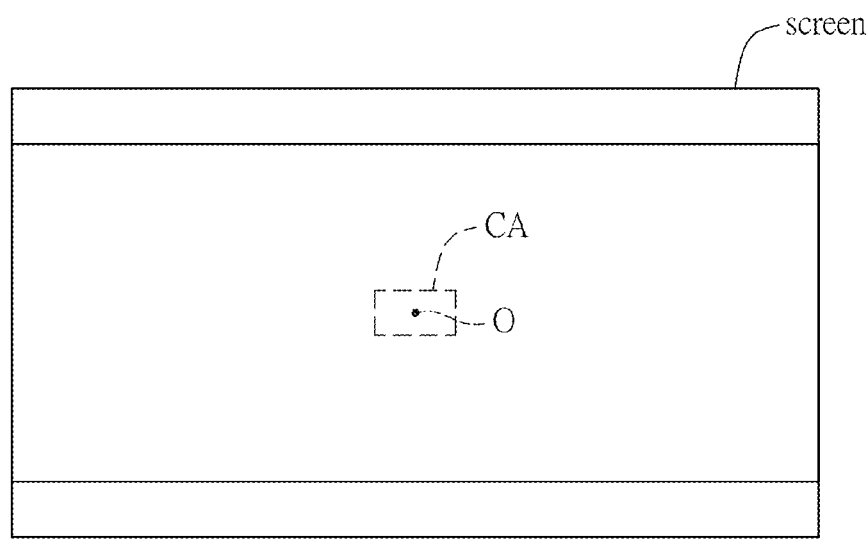
FIG. 5B is a schematic diagram showing the central area of the screen according to the preferred embodiment of the invention.

As shown in FIG. 5A, the packed frame of the first embodiment can be directly displayed on the 2D screen. Herein, the center point of the color frame (the cross point of the diagonal lines of the color frame) and the center point of the screen (the cross point of the diagonal lines of the screen), which are all the center point O, are overlapped. Accordingly, the packed frame can be directly displayed on the screen of the 2D display device. The displayed color frame in the 2D screen viewed by eyes is very smooth and will not make the viewer feel uncomfortable. Of course, in order to avoid the uncomfortable feeling, it is discovered that to display the center of the color frame at the central area of the screen can provide satisfied effect. In this case, the central area includes the center point and several pixels surrounding the center point. The center area can be, for example, a circular or square area. For example, FIG. 5B shows a central area of the screen as the 2D display device displays the packed frame. In FIG. 5B, the central area CA of the screen includes the center point O of the screen and the area surrounding the center point O (about 1/3 of the screen). When the center of the color frame is located within this area, the viewer will not feel uncomfortable.

Figure 6:
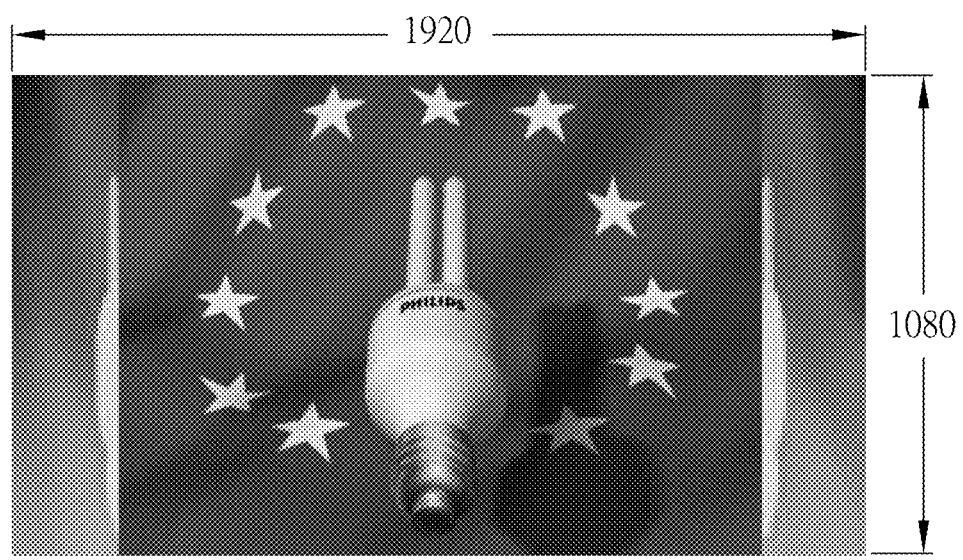
FIGS. 6, 7A-7D and 8A-8B are schematic diagrams showing the procedure for unpacking the packed frame of a second embodiment.

The unpacking method and device of a packed frame of a second embodiment will be described hereinafter with reference to FIGS. 1A and 1B in view of FIGS. 6 to 8B. FIGS. 6 to 8B are schematic diagrams showing the procedure for unpacking the packed frame of a second embodiment. FIG. 6 shows a packed frame, FIG. 7A shows two parts of a resized depth frame, FIG. 7B shows a resized depth frame, FIG. 7C shows an intermediate depth frame, FIG. 7D shows an original depth frame, FIG. 8A shows a color frame, and FIG. 8B shows an original color frame.

Figure 7A:
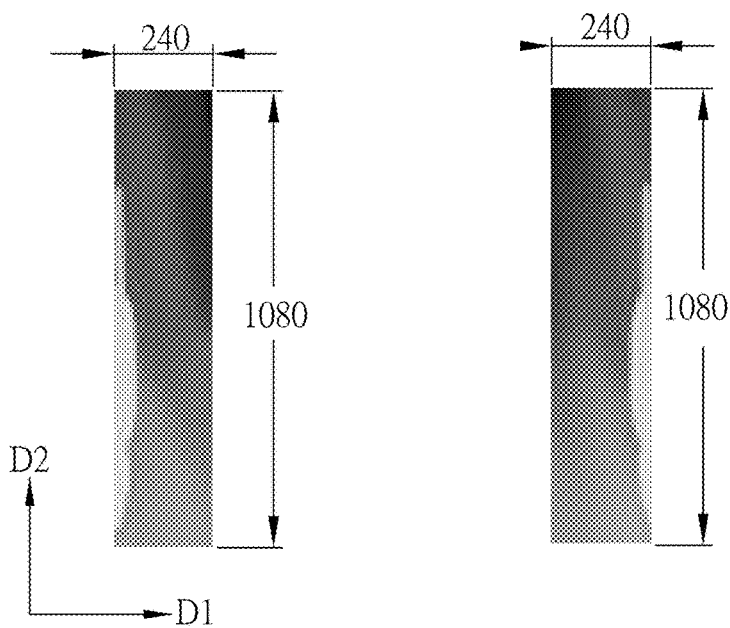
Figure 8A:
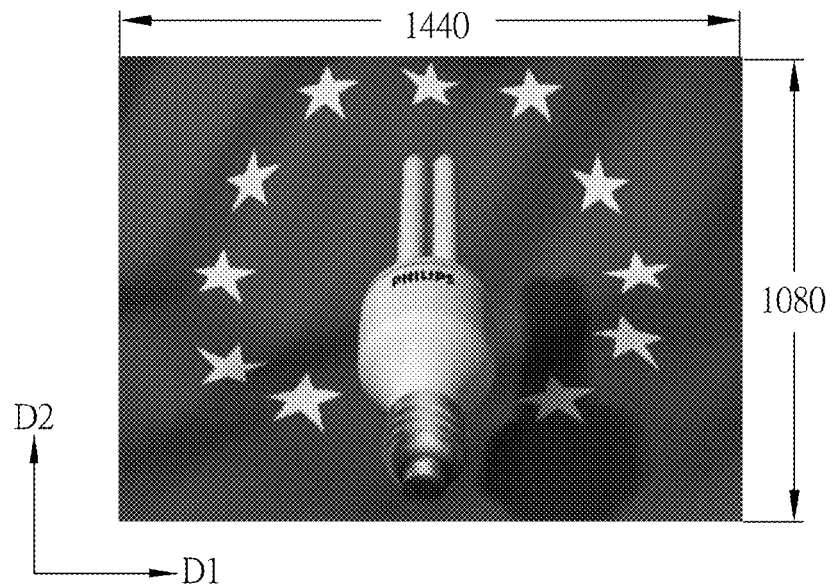
Figure 8B:
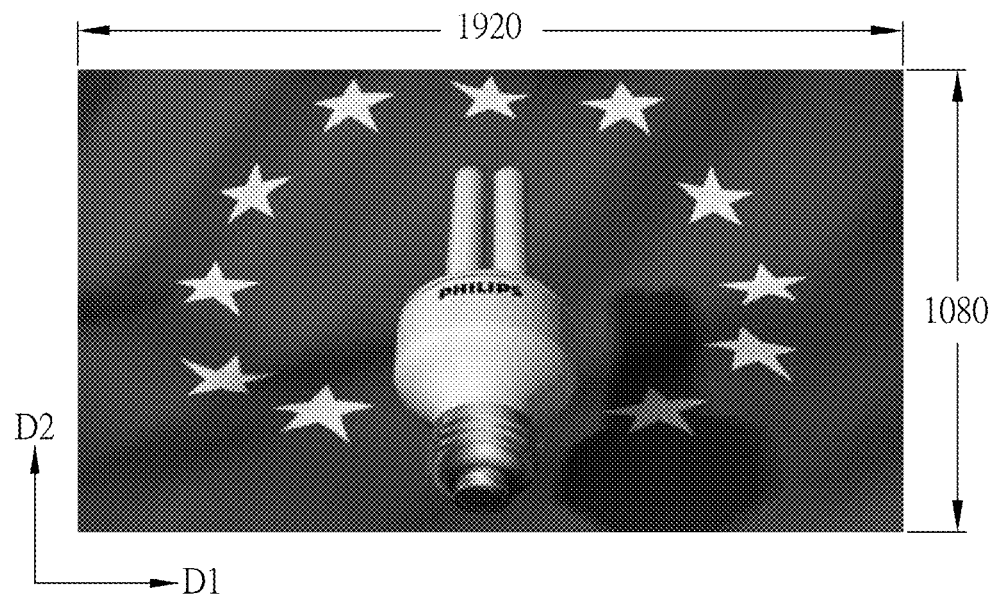

At first, the step S01 of this method is also to extract a color frame and a resized depth frame from the packed frame (extracting two parts of the resized depth frame of FIG. 7A and the color frame of FIG. 8A from the packed frame of FIG. 6). Herein, the extract processing unit 11 extracts the two parts of the resized depth frame from the left and right sides of the packed frame (vertical splitting) so as to obtain two parts of the resized depth frame of FIG. 7A and the color frame of FIG. 8A. In this case, the two parts of the resized depth frame are extracted along the column direction D2, and the sizes of the two parts of the resized depth frame are the same and are both 240×1080.

Figure 7B:
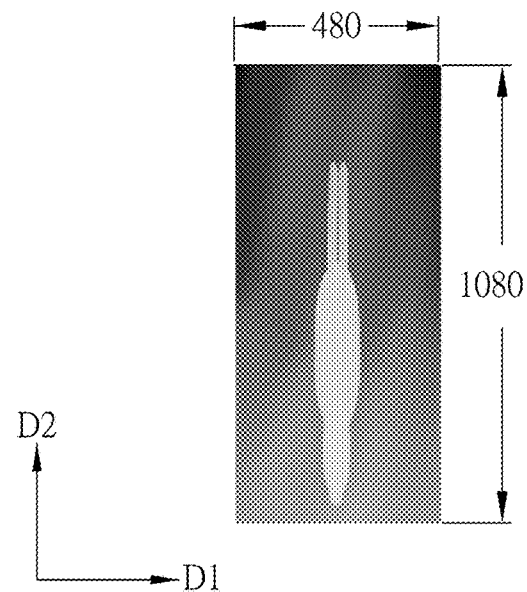

After obtaining the two parts of the resized depth frame, the combine processing unit 14 can combine them to obtain a resized depth frame (from FIG. 7A to FIG. 7B). Before generating the resized depth frame, the rotate processing unit 13 can exchange the positions of the two parts of the resized depth frame and then the combine processing unit 14 can combine the two parts of the resized depth frame to obtain the resized depth frame. The sizes of the two parts of the resized depth frame are the same and are all 240×1080, so that the size of the combined resized depth frame is 480×1080, while the size of the color frame is 1440×1080 (1440=1920−240−240).

Figure 7C:
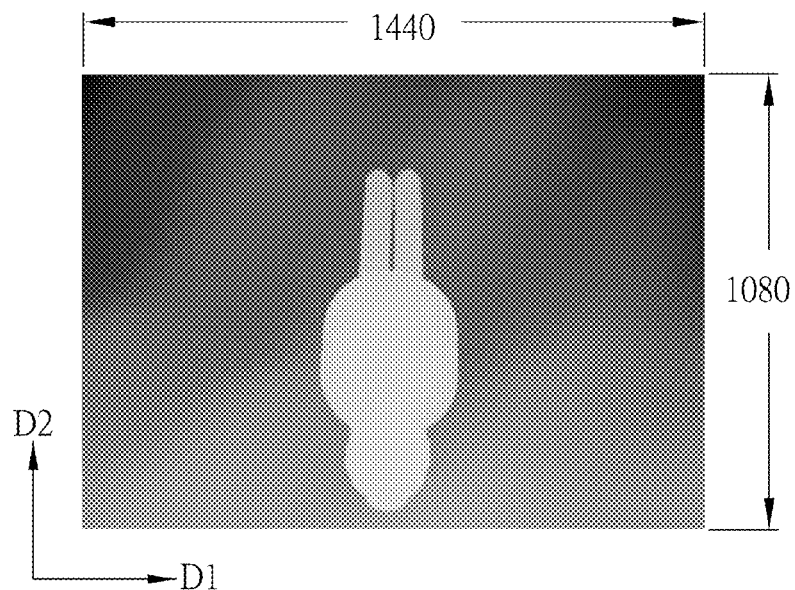
Figure 7D:
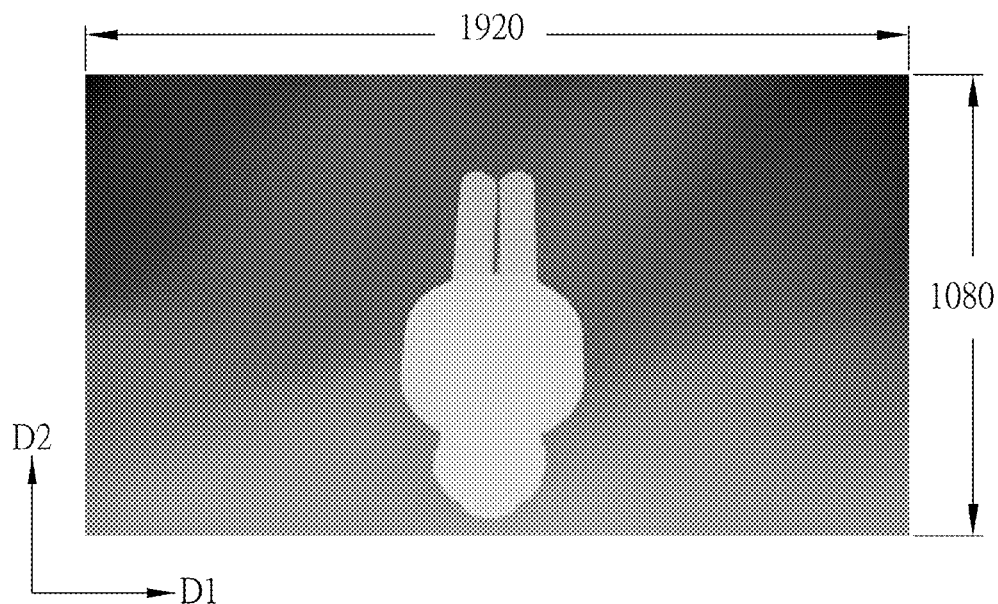

Next, the step S02 is performed to restore the resized depth frame to obtain an original depth frame (restoring FIG. 7B to FIG. 7D). Before restoring the original depth frame, the sub-pixels of the resized depth frame of FIG. 7B are rearranged to obtain an intermediate depth frame of FIG. 7C. Then the intermediate depth frame is resized to obtain the original depth frame of FIG. 7D. The sub-pixel rearrangement is to retrieve a first sub-pixel value and a second sub-pixel value of a pixel of the resized depth frame, to store the first sub-pixel value in all sub-pixels of a first pixel of the intermediate depth frame, and to store the second sub-pixel value to all sub-pixels of a second pixel of the intermediate depth frame. In other words, assuming one pixel includes three sub-pixels, the sub-pixel rearrangement is to store a first sub-pixel value of a first pixel of the resized depth frame in all sub-pixels of a first pixel of the intermediate depth frame, to store a second sub-pixel value of the first pixel of the resized depth frame to all sub-pixels of a second pixel of the intermediate depth frame, and to store a third sub-pixel value of the first pixel of the resized depth frame to all sub-pixels of a third pixel of the intermediate depth frame. This rule can be applied to all other pixels and sub-pixels of the frames.

In this embodiment, the size of the resized depth frame of FIG. 7B is resized to triple of the size of the original one along the row direction D1, so that the size of the intermediate depth frame of FIG. 7C as well as the data amount thereof is triple of the size of the resized depth frame along the row direction D1. As a result, the resolution of the intermediate depth frame of FIG. 7C is 1440×1080 (1440=480×3).

Then, the restore processing unit 12 restores the intermediate depth frame to obtain an original depth frame (restoring FIG. 7C to FIG. 7D). In this case, this step can be carried out by proportionally upscaling the size of the intermediate depth frame of FIG. 7C along the row direction D1 so as to obtain the original depth frame of FIG. 7D. Herein, the size of the original depth frame is increased to 4/3 of the size of the intermediate depth frame along the row direction D1. As shown in FIG. 7D, the size of the original depth frame is 1920×1080 (1920=1440×4/3).

In addition, the unpacking method further includes a step of restoring the color frame to obtain an original color frame (from FIG. 8A to FIG. 8B). The restore processing unit 12 can restore the color frame to proportionally upscale the color frame (1440×1080) to 4/3 of the original one along the row direction D1, thereby obtaining the original color frame. That is, the size of the original color frame of FIG. 8B is 1920×1080. The original color frame has a preset frame size of 1920×1080, and the size of the packed frame is the same as the preset frame size. Besides, the original depth frame is corresponding to the original color frame.

If the size of the color frame is A times of the size of the original color frame along a direction, and the size of the intermediate depth frame is B times of the size of the original depth frame along the direction, A and B need to fit the equality of A+B/3=1. This invention is not to limit the values of A and B. In the first embodiment, the restore ratio a of the intermediate depth frame along the column direction D2 is the same as the restore ratio b of the color frame along the column direction D2, which means A=B=3/4. In the second embodiment, the restore ratio a of the intermediate depth frame along the row direction D1 is the same as the restore ratio B of the color frame along the row direction D1, which means A=B=3/4.

Figure 9:
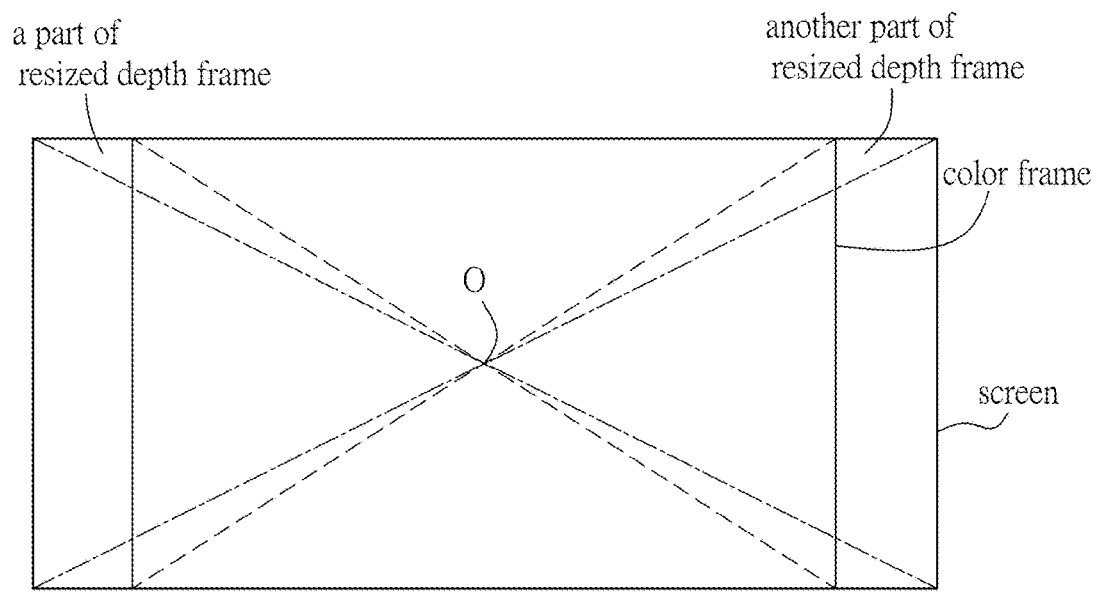
FIG. 9 is a schematic diagram showing the color frame and a screen as a 2D display device displays the packed frame of the second embodiment.

FIG. 9 is a schematic diagram showing the color frame and a screen as a 2D display device displays the packed frame of the second embodiment.

As shown in FIG. 9, the packed frame of the second embodiment can be directly displayed on the 2D screen. Herein, the center point of the color frame (the cross point of the diagonal lines of the color frame) and the center point of the screen (the cross point of the diagonal lines of the screen), which are all the center point O, are overlapped. Accordingly, the displayed color frame (2D image) viewed by eyes is very smooth and will not make the viewer feel uncomfortable. Of course, as mentioned in the previous embodiment, to display the center of the color frame at the central area of the screen can provide the same effect. This invention is not limited to the case of overlapping the center points.

Figure 10:
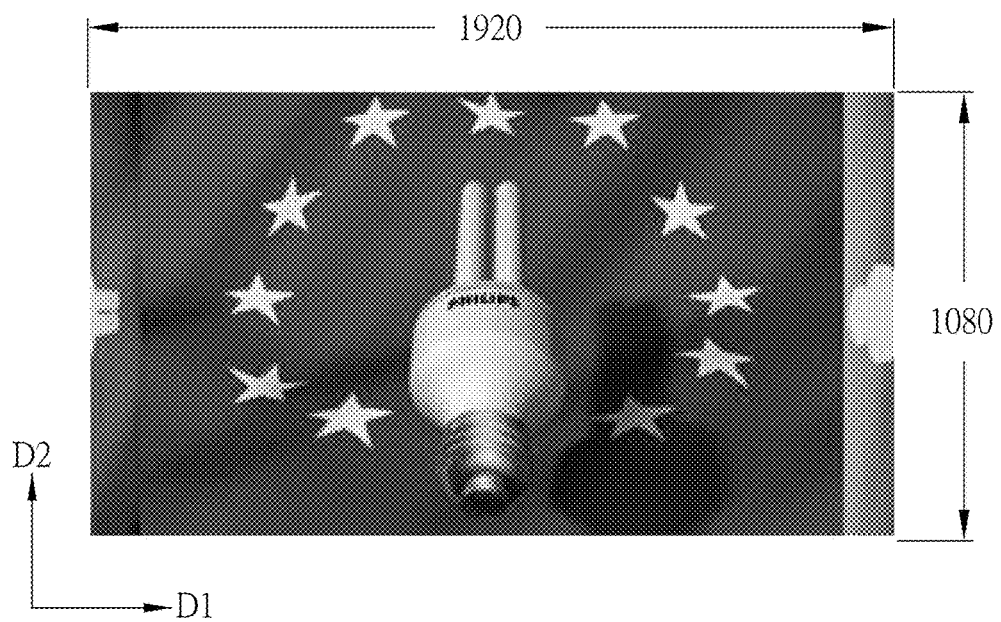
FIGS. 10, 11A-11D and 12A-12B are schematic diagrams showing the procedure for unpacking the packed frame of a third embodiment.
Figure 11A:
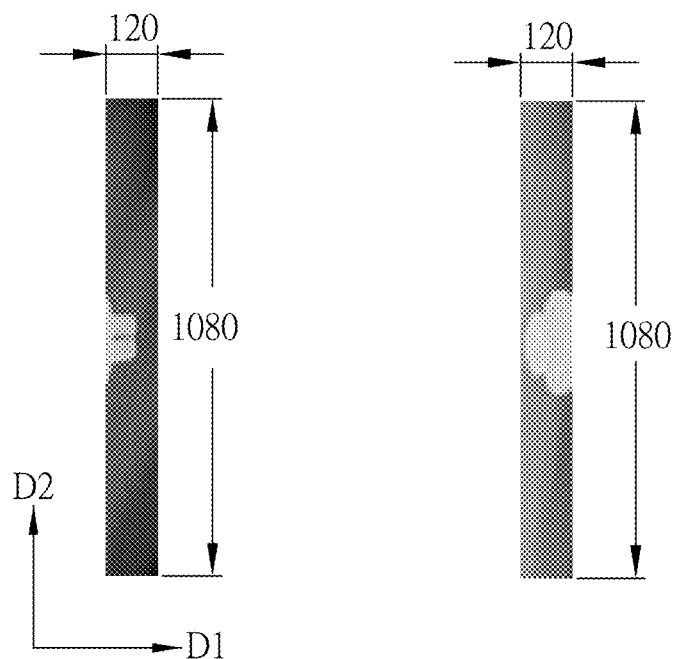

The unpacking method and device of a packed frame of a third embodiment will be described hereinafter with reference to FIGS. 1A and 1B in view of FIGS. 10 to 12B. FIGS. 10 to 12B are schematic diagrams showing the procedure for unpacking the packed frame of a third embodiment. FIG. 10 shows a packed frame, FIG. 11A shows two parts of a resized depth frame, FIG. 11B shows a resized depth frame, FIG. 11C shows an intermediate depth frame, FIG. 11D shows an original depth frame, FIG. 12A shows a color frame, and FIG. 12B shows an original color frame.

The procedure of the third embodiment is mostly the same as the procedure of the second embodiment. In the third embodiment, the extract processing unit 11 extracts the two parts of the resized depth frame from the left and right sides of the packed frame (vertical splitting) so as to obtain two parts of the resized depth frame of FIG. 11A and the color frame of FIG. 12A. The difference is that the sizes of the two parts of the resized depth frame of FIG. 11A are all 120× 1080. Before the combine processing unit 14 combines them to obtain a resized depth frame, the rotate processing unit 13 can rotate the two parts of the resized depth frame. Then, the combine processing unit 14 can combine the two parts of the resized depth frame to obtain the resized depth frame. Herein, "rotate" means the two parts of the resized depth frame are rotated counterclockwise by 90 degrees. The sizes of the two parts of the resized depth frame are the same and are all 120×1080, so that the size of the combined resized depth frame is 1080×240, while the size of the color frame is 1680×1080 (1680=1920−120−120).

Figure 11B:
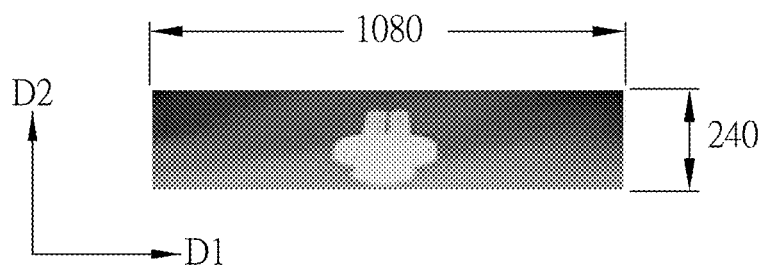
Figure 11C:
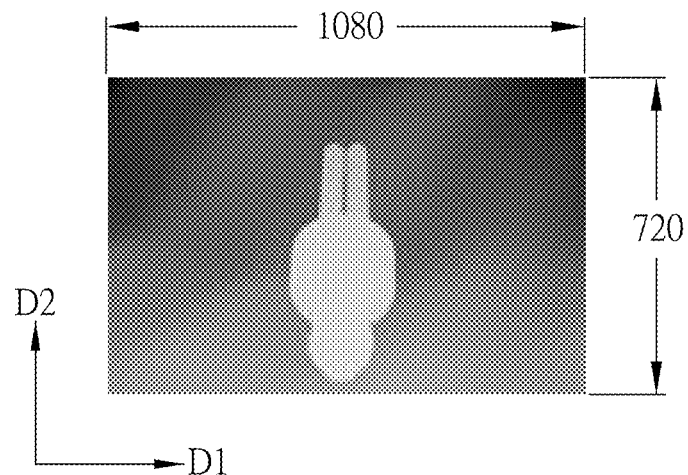
Figure 11D:
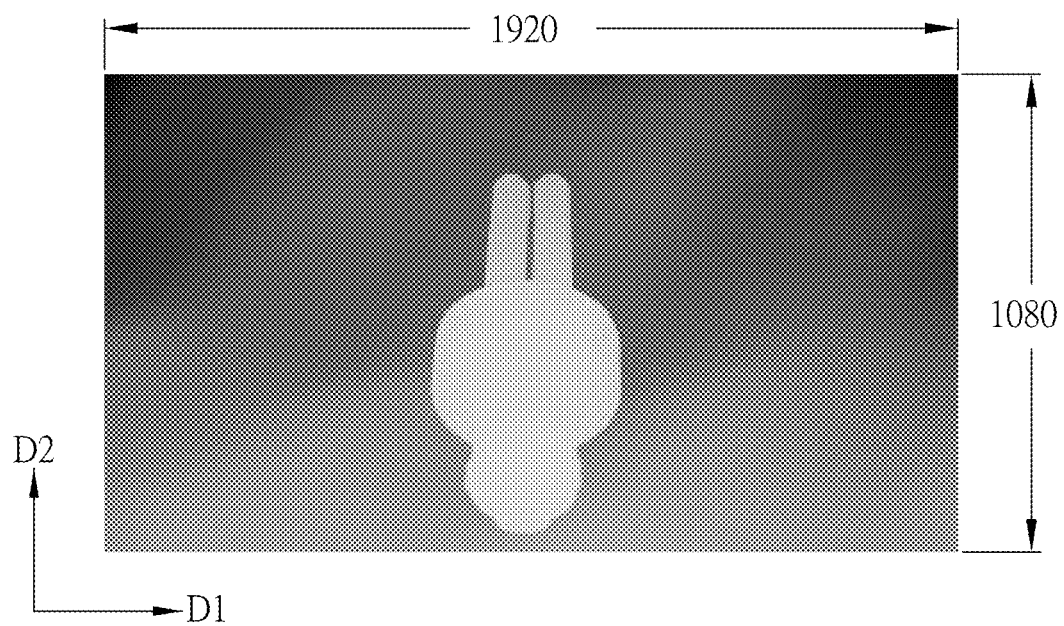
Figure 12A:
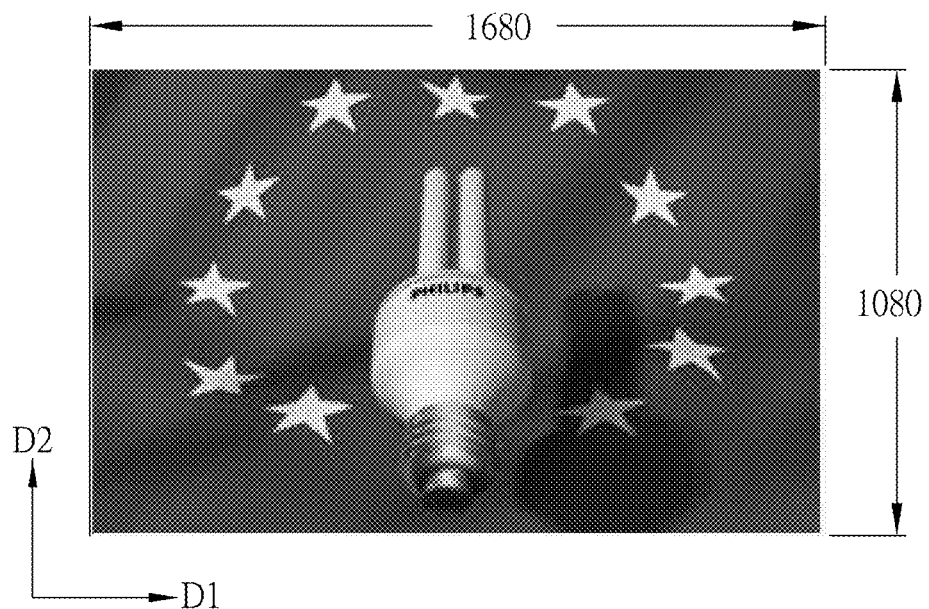
Figure 12B:
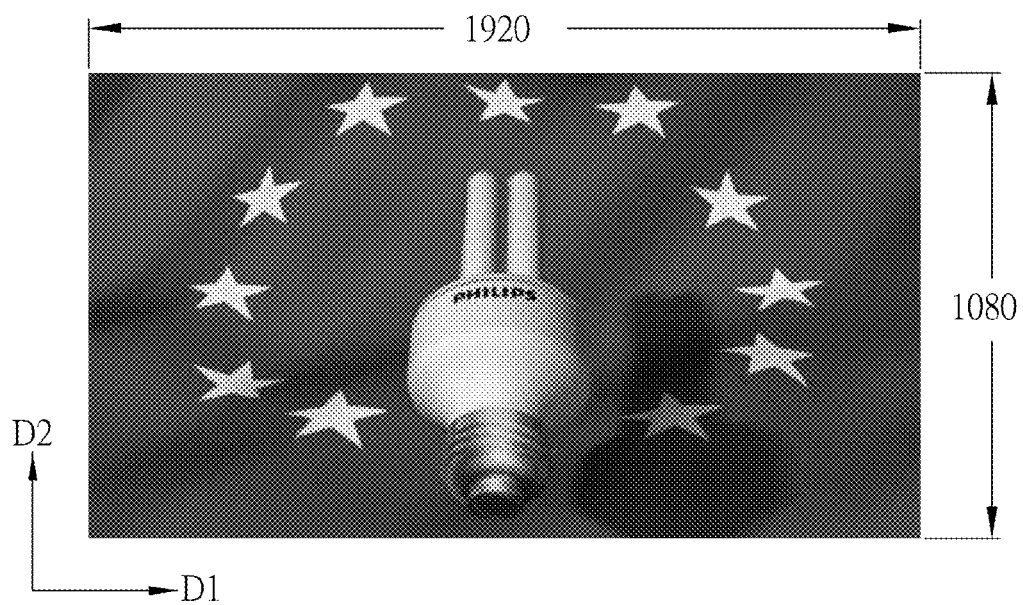

In addition, the sub-pixels of the resized depth frame of FIG. 11B are rearranged to obtain the intermediate depth frame of FIG. 11C, and then the intermediated depth frame is resized to obtain the original depth frame of FIG. 11D. In this embodiment, the size of the resized depth frame of FIG. 11B is resized to triple of the size of the original one along the column direction D2 (the size along the row direction D1 keeps the same), so that the size of the intermediate depth frame of FIG. 11C is triple of the size of the resized depth frame along the column direction D2. As a result, the resolution of the intermediate depth frame of FIG. 11C is 1080×720 (720=240×3).

Then, the restore processing unit 12 restores the intermediate depth frame to obtain an original depth frame (restoring FIG. 11C to FIG. 11D). In this case, this step can be carried out by proportionally upscaling the size of the intermediate depth frame of FIG. 11C along the row direction D1 and the column direction D2 so as to obtain the original depth frame of FIG. 11D. Herein, the size is increased to 3/2 of the original one along the column direction D2 and is increased to 16/9 of the original one along the row direction D1. As shown in FIG. 11D, the size of the original depth frame is 1920×1080 (1920=1080×16/9 and 1080=720×3/2). Of course, in other embodiments, the size of the frame can be upscaled by other proportions or it can be upscaled along the row direction D1 or the column direction D2. This invention is not limited.

In addition, the color frame of FIG. 12A is restored to obtain an original color frame of FIG. 12B. Herein, the size of the color frame (1680×1080) is upscaled to 8/7 of the original one along the row direction D1, thereby obtaining the original color frame. That is, the size of the original color frame of FIG. 12B is 1920×1080. The original color frame has a preset frame size of 1920×1080, and the size of the packed frame is the same as the preset frame size.

Figure 13:
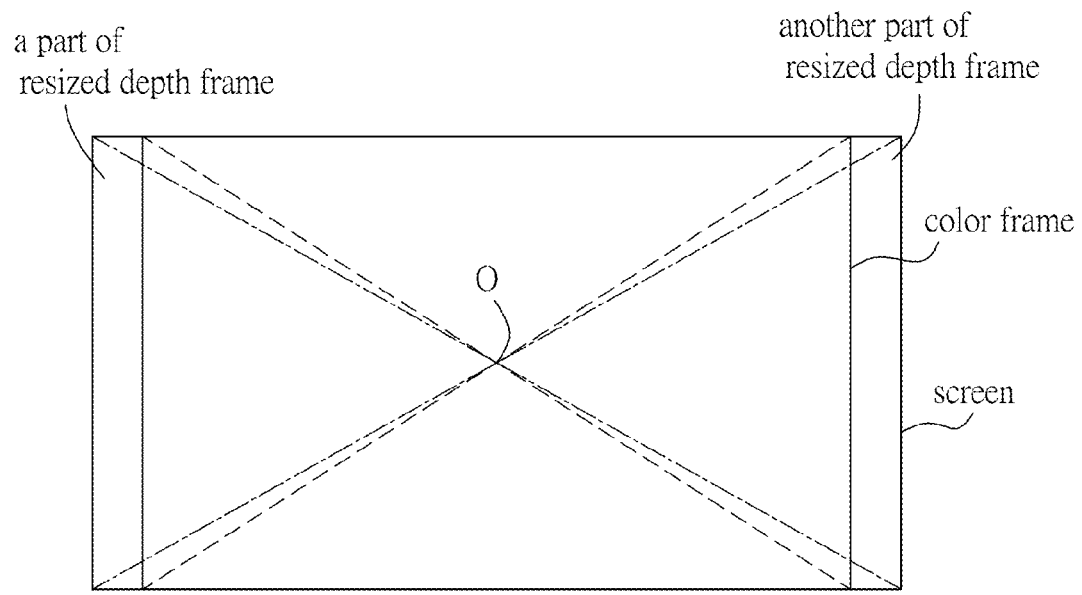
FIG. 13 is a schematic diagram showing the color frame and a screen as a 2D display device displays the packed frame of the third embodiment.

FIG. 13 is a schematic diagram showing the color frame and a screen as a 2D display device displays the packed frame of the third embodiment.

As shown in FIG. 13, the packed frame of the third embodiment can be directly displayed on the 2D screen. Herein, the center point of the color frame (the cross point of the diagonal lines of the color frame) and the center point of the screen (the cross point of the diagonal lines of the screen), which are all the center point O, are overlapped. Accordingly, the displayed color frame (2D image) viewed by eyes is very smooth and will not make the viewer feel uncomfortable. Of course, as mentioned in the previous embodiment, to display the center of the color frame at the central area of the screen can provide the same effect. This invention is not limited to the case of overlapping the center points.

To be noted, in the first, second and third embodiments, the size of the packed frame and the preset frame size of the original color frame are the same and are both 1920×1080. Accordingly, the packed frame applied in the first, second and third embodiments will not cause additional load for the transmission bandwidth during data transmission, and it will not cause the overloading of the 3D display device in the user end due to the exceeded decompression calculations.

Figure 14:
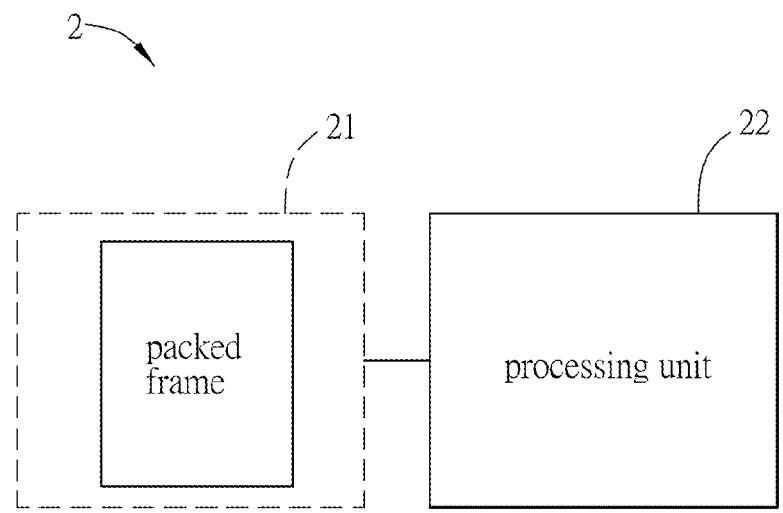
FIG. 14 is a functional block diagram of an unpacking system of a packed frame according to a preferred embodiment of the invention.

FIG. 14 is a functional block diagram of an unpacking system 2 of a packed frame according to a preferred embodiment of the invention. The packed frame is to be displayed on a 2D screen and includes a color frame and a resized depth frame. The color frame is corresponding to the resized depth frame, and the center of the color frame is displayed in a central area of the screen.

The unpacking system 2 includes a memory unit 21 and a processing unit 22, which are electrically connected to each other. The memory unit 21 stores the packed frame. Of course, the memory unit 21 also stores the original color frame, the original depth frame, the color frame, the resized depth frame and the two parts thereof. The memory unit 21 can be a non-transitory computer readable storage medium, such as a memory, memory card, CD, tape, or any of their combinations, for storing the needed information. In this embodiment, the memory can be a ROM, RAM, flash memory, FPGA, and any usable memory, and this invention is not limited.

The processing unit 22 includes the core control assembly of the system 2, such as a CPU and a memory, or including any control hardware, software or firmware. In this embodiment, the processing unit 22 extracts two parts of the resized depth frame from the left and right sides of the packed frame, rotates the two parts of the resized depth frame, and combines the two parts of the resized depth frame to obtain the resized depth frame. In addition, the processing unit 22 further rearranges the sub-pixels of the resized depth frame to obtain an intermediate depth frame. In this step, the processing unit 22 retrieves a first sub-pixel value and a second sub-pixel value of a pixel of the resized depth frame, stores the first sub-pixel value in all sub-pixels of a first pixel of the intermediate depth frame, and stores the second sub-pixel value to all sub-pixels of a second pixel of the intermediate depth frame. Moreover, the processing unit 22 restores the intermediate depth frame to obtain an original depth frame. The processing unit 22 also restores the color frame to obtain an original color frame.

In the unpacking system 2, the other technical features of the original depth frame, the intermediate depth frame, the resized depth frame, the color frame, the original color frame and the packed frame have been described in the previous embodiments, so they will be omitted.

To sum up, in the invention, the packed frame includes a color frame and a resized depth frame, and the color frame is corresponding to the resized depth frame. The color frame and the resized depth frame are extracted from the packed frame, and an original depth frame is obtained by restoring the resized depth frame. Accordingly, the unpacking method, unpacking device and unpacking system of the invention are different from the conventional art. In addition, the packed frame can be displayed in a screen, and the center of the color frame is displayed at the central area of the screen. The center point of the color frame and the center point of the screen are preferably overlapped and most preferably totally overlapped. Moreover, the color frames (2D images) are smoothly shown in the central area of a screen and will not make the viewer uncomfortable.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An unpacking method of a packed frame, wherein the packed frame is to be displayed on a screen and comprises a color frame and a resized depth frame, the color frame is corresponding to the resized depth frame, and the center of the color frame is displayed in a central area of the screen, the unpacking method comprising steps of:
    extracting the color frame and the resized depth frame from the packed frame; and
    restoring the resized depth frame to obtain an original depth frame;
    wherein the packed frame comprises a center part and two opposite side parts, the center part is between the two opposite side parts, the step of extracting the color frame and the resized depth frame from the packed frame comprises:
        extracting two of the resized depth frame respectively from the two opposite side parts of the packed frame;
        combining the two parts of the resized depth frame to obtain the resized depth frame; and
        extracting the color frame from the center part of the packed frame.

2. The unpacking method of claim 1, wherein a center point of the color frame is overlapped with a center point of the screen.

3. The unpacking method of claim 1, wherein
    the two opposite side parts are at a top side and a bottom side of the packed frame.

4. The unpacking method of claim 3, wherein before combining the two parts of the resized depth frame to obtain the resized depth frame, the step of extracting the color frame and the resized depth frame from the packed frame further comprises:
    flipping the two parts of the resized depth frame.

5. The unpacking method of claim 1, wherein:
    the two opposite side parts are at a left side and a right side of the packed frame.

6. The unpacking method of claim 5, wherein before combining the two parts of the resized depth frame to obtain the resized depth frame, the step of extracting the color frame and the resized depth frame from the packed frame further comprises:
    rotating the two parts of the resized depth frame.

7. The unpacking method of claim 1, further comprising a step of:
    restoring the color frame to obtain an original color frame.

8. The unpacking method of claim 1, wherein the step of restoring the resized depth frame to obtain an original depth frame comprises:
    rearranging sub-pixels of the resized depth frame to obtain an intermediate depth frame; and
    resizing the intermediate depth frame to obtain the original depth frame.

9. The unpacking method of claim 8, wherein the size of the intermediate depth frame is triple of the size of the resized depth frame along a column direction.

10. The unpacking method of claim 8, wherein the step of obtaining the intermediate depth frame is to retrieve a first sub-pixel value and a second sub-pixel value of a pixel of the resized depth frame, to store the first sub-pixel value in all sub-pixels of a first pixel of the intermediate depth frame, and to store the second sub-pixel value to all sub-pixels of a second pixel of the intermediate depth frame.

11. The unpacking method of claim 8, wherein the size of the original depth frame is 4/3 of the size of the intermediate depth frame along a column direction.

12. The unpacking method of claim 7, wherein the size of the color frame is A times of the size of the original color frame along a direction, and the size of the intermediate depth frame is B times of the size of the original depth frame along the direction.

13. The unpacking method of claim 12, wherein A and B fit the equality of $A+B/3=1$.

14. The unpacking method of claim 12, wherein A and B are 3/4, respectively.

15. An unpacking device of a packed frame, wherein the packed frame is to be displayed on a screen and comprises a color frame and a resized depth frame, the color frame is corresponding to the resized depth frame, and the center of the color frame is displayed in a central area of the screen, the unpacking device comprising:
    an extract processing unit for extracting the color frame and the resized depth frame from the packed frame, wherein the packed frame comprises a center part and two opposite side parts, the center part is between the two opposite side parts, the extract processing unit extracts two parts of the resized depth frame from two opposite side parts of the packed frame, and extracts the color frame from the center part of the packed frame;

a restore processing unit for restoring the resized depth frame to obtain an original depth frame; and a combine processing unit for combining the two parts of the resized depth frame to obtain the resized depth frame.

16. The unpacking device of claim 15, wherein a center point of the color frame is overlapped with a center point of the screen.

17. The unpacking device of claim 15, wherein the two opposite side parts are at a top side and a bottom side of the packed frame.

18. The unpacking device of claim 17, further comprising:
a rotate processing unit for flipping the two parts of the resized depth frame.

19. The unpacking device of claim 15, wherein the two opposite side parts are at a left side and a right side of the packed frame.

20. The unpacking device of claim 19, further comprising:
a rotate processing unit for rotating the two parts of the resized depth frame.

21. The unpacking device of claim 15, wherein the restore processing unit further restores the color frame to obtain an original color frame.

22. The unpacking device of claim 15, wherein the restore processing unit rearranges sub-pixels of the resized depth frame to obtain an intermediate depth frame.

23. The unpacking device of claim 22, wherein the size of the intermediate depth frame is triple of the size of the resized depth frame along a column direction.

24. The unpacking device of claim 22, wherein the restore processing unit further retrieves a first sub-pixel value and a second sub-pixel value of a pixel of the resized depth frame, stores the first sub-pixel value in all sub-pixels of a first pixel of the intermediate depth frame, and stores the second sub-pixel value to all sub-pixels of a second pixel of the intermediate depth frame.

25. The unpacking device of claim 22, wherein the size of the original depth frame is 4/3 of the size of the intermediate depth frame along a column direction.

26. The unpacking device of claim 21, wherein the size of the color frame is A times of the size of the original color frame along a direction, and the size of the intermediate depth frame is B times of the size of the original depth frame along the direction.

27. The unpacking device of claim 26, wherein A and B fit the equation of A+B/3=1.

28. The unpacking device of claim 26, wherein A and B are 3/4, respectively.

29. An unpacking system of a packed frame, wherein the packed frame is to be displayed on a screen and comprises a color frame and a resized depth frame, the color frame is corresponding to the resized depth frame, and the center of the color frame is displayed in a central area of the screen, the unpacking system comprising:

a memory unit for storing the packed frame; and a processing unit for extracting the color frame and the resized depth frame from the packed frame, and restoring the resized depth frame to obtain an original depth frame;

wherein the packed frame comprises a center part and two opposite side parts, the center part is between the two opposite side parts, the processing unit extracts two parts of the resized depth frame from two opposite side parts of the packed frame and extracts the color frame from the center part of the packed frame, and the processing unit further combines the two parts of the resized depth frame to obtain the resized depth frame.

30. The unpacking system of claim 29, wherein a center point of the color frame is overlapped with a center point of the screen.

31. The unpacking system of claim 29, wherein the two opposite side parts are at a top side and a bottom side of the packed frame.

32. The unpacking system of claim 31, wherein the processing unit further flips the two parts of the resized depth frame.

33. The unpacking system of claim 29, wherein the two opposite side parts are at a left side and a right side of the packed frame.

34. The unpacking system of claim 33, wherein the processing unit further rotates the two parts of the resized depth frame.

35. The unpacking system of claim 29, wherein the processing unit further restores the color frame to obtain an original color frame.

36. The unpacking system of claim 29, wherein the processing unit further rearranges sub-pixels of the resized depth frame to obtain an intermediate depth frame.

37. The unpacking system of claim 36, wherein the size of the intermediate depth frame is triple of the size of the resized depth frame along a column direction.

38. The unpacking system of claim 36, wherein the processing unit further retrieves a first sub-pixel value and a second sub-pixel value of a pixel of the resized depth frame, stores the first sub-pixel value in all sub-pixels of a first pixel of the intermediate depth frame, and stores the second sub-pixel value to all sub-pixels of a second pixel of the intermediate depth frame.

39. The unpacking system of claim 36, wherein the size of the original depth frame is 4/3 of the size of the intermediate depth frame along a column direction.

40. The unpacking system of claim 35, wherein the size of the color frame is A times of the size of the original color frame along a direction, and the size of the intermediate depth frame is B times of the size of the original depth frame along the direction.

41. The unpacking system of claim 40, wherein A and B fit the equality of A+B/3=1.

42. The unpacking system of claim 40, wherein A and B are 3/4, respectively.

* * * * *